United States Patent
Kim et al.

(10) Patent No.: US 11,991,745 B2
(45) Date of Patent: May 21, 2024

(54) METHOD AND DEVICE FOR IDENTIFYING CHANNEL INFORMATION IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 665 days.

(21) Appl. No.: 17/261,539

(22) PCT Filed: Jul. 19, 2019

(86) PCT No.: PCT/KR2019/008973
§ 371 (c)(1),
(2) Date: Jan. 19, 2021

(87) PCT Pub. No.: WO2020/022712
PCT Pub. Date: Jan. 30, 2020

(65) Prior Publication Data
US 2021/0298076 A1    Sep. 23, 2021

(30) Foreign Application Priority Data

Jul. 19, 2018   (KR) .................. 10-2018-0084375

(51) Int. Cl.
*H04W 48/12*     (2009.01)
*H04W 48/16*     (2009.01)
(Continued)

(52) U.S. Cl.
CPC ....... *H04W 74/0808* (2013.01); *H04W 48/16* (2013.01); *H04W 72/0453* (2013.01); *H04W 84/12* (2013.01)

(58) Field of Classification Search
CPC ............. H04W 74/0808; H04W 48/16; H04W 72/0453; H04W 84/12
See application file for complete search history.

(56) References Cited

U.S. PATENT DOCUMENTS 11,303,426 B2 *   4/2022   Amel .................. H04L 69/22
2018/0109405 A1   4/2018   Lee et al.
(Continued)

FOREIGN PATENT DOCUMENTS

WO    2018071022        4/2018
WO    WO-2018232138 A1 *  12/2018

OTHER PUBLICATIONS

Wu, et al., "Follow up discussions on Throughput Enhancement", doc.: IEEE 802.11-17/1184r0, Jul. 2018, 19 pages.
(Continued)

*Primary Examiner* — Diane L Lo
*Assistant Examiner* — Abusayeed M Haque
(74) *Attorney, Agent, or Firm* — LEE, HONG, DEGERMAN, KANG & WAIMEY

(57) ABSTRACT

Provided is a method for providing information related to at least one channel supported in a wireless local area network (WLAN) system. For example, an extreme high throughput (EHT) operation element may include information related to at least one channel in a first band supporting an EHT standard. A very high throughput (VHT) operation element may include information related to at least one channel in a second band supporting a VHT standard. A high throughput (HT) operation element may include information related to at least one channel in a third band supporting an HT standard. The EHT operation element may include information for a channel number related to at least one channel in the first band and information related to a primary channel in the first band.

8 Claims, 21 Drawing Sheets

(51) Int. Cl.
*H04W 72/0453* (2023.01)
*H04W 74/08* (2009.01)
*H04W 74/0808* (2024.01)
*H04W 84/12* (2009.01)

(56) References Cited

U.S. PATENT DOCUMENTS

| | | | |
|---|---|---|---|
| 2018/0183498 A1 | 6/2018 | Amini et al. | |
| 2019/0007180 A1* | 1/2019 | Shi | H04L 5/0007 |
| 2022/0394721 A1* | 12/2022 | Umehara | H04W 72/0453 |
| 2023/0049630 A1* | 2/2023 | Sonoyama | A61K 8/60 |
| 2023/0097045 A1* | 3/2023 | Huang | H04W 76/15 |
| | | | 370/329 |
| 2023/0125078 A1* | 4/2023 | Huang | H04W 76/15 |
| | | | 370/328 |
| 2023/0199845 A1* | 6/2023 | Sun | H04L 1/1614 |
| | | | 370/329 |

OTHER PUBLICATIONS

Choi, et al., "View on EHT Objectives and Technologies", doc.: IEEE 802.11-18/1171r0, Jul. 2018, 15 pages.
PCT International Application No. PCT/KR2019/008973, International Search Report dated Oct. 24, 2019, 4 pages.

* cited by examiner

METHOD AND DEVICE FOR IDENTIFYING CHANNEL INFORMATION IN WIRELESS LAN SYSTEM

CROSS-REFERENCE TO RELATED APPLICATIONS

This application is the National Stage filing under 35 U.S.C. 371 of International Application No. PCT/KR2019/008973, filed on Jul. 19, 2019 which claims the benefit of Korean Application No. 10-2018-0084375, filed on Jul. 19, 2018, the contents of which are all hereby incorporated by reference herein in their entirety.

BACKGROUND OF THE DISCLOSURE

Field of the Disclosure

The present disclosure relates to a technique for transmitting and receiving channel information in wireless communication, and more particularly, to a method and apparatus for configuring and receiving a packet including channel information in a wireless local area network (WLAN) system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

This disclosure proposes technical features which may improve the existing IEEE 802.11ax standard or which may be used in anew communication standard. For example, the new communication standard may be an extreme high throughput (EHT) standard currently under discussion. The EHT standard may use a newly proposed increased bandwidth, an improved PPDU structure, an improved sequence, a hybrid automatic repeat request (HARQ) technique, etc.

In the EHT standard, a bandwidth of a channel may be increased compared to a conventional WLAN system, and a band or link in which a channel is configured may be varied. For example, the EHT standard may operate in a 6 GHz band, and a bandwidth of a radio channel related to the EHT standard may be 240 MHz or 320 MHz.

SUMMARY

Since the initial IEEE 802.11 standard defined the operation of transmitting/receiving signals only on one 20 MHz channel, a station (STA) determined a channel on which a beacon frame or probe response frame is transmitted as a sole channel in which an access point (AP) operates. Therefore, the AP did not need to provide additional channel information to the STA. However, since multi-channel transmission is supported, starting from the IEEE 802.11n standard, the AP needs to additionally transmit information related to an operating channel thereof to the STA, while transmitting in a 20 MHz channel unit in the beacon frame, the probe response frame, or the like for backward compatibility with the legacy STA.

In the newly proposed EHT standard, a bandwidth of a channel may be increased compared to the existing WLAN system. For example, the EHT standard may operate in a 6 GHz band, and a bandwidth of a radio channel related to the EHT standard may be increased to such as 240 MHz or 320 MHz. Therefore, a frame structure capable of accurately signaling information related to radio resources (i.e., band/channel bandwidth, etc.) supported by the AP/STA should be designed.

An example according to the present disclosure relates to a method and/or device for a WLAN.

For example, a receiving device may receive a control message including information related to at least one channel supported in one basic service set (BSS) from an access point (AP).

The control message may include an extreme high throughput (EHT) operation element including information related to at least one channel in a first band in which the EHT standard is supported, a very high throughput (VHT) operation element including information related to at least one channel in a second band in which a VHT standard is supported, and a high throughput (HT) operation element including information related to at least one channel in a third band in which an HT standard is supported.

The EHT operation element may include information for a channel number related to at least one channel in the first band and information related to a primary channel in the first band.

The receiving device may obtain information related to at least one channel supported by the AP based on the control message.

The receiving device may perform communication based on at least one of the channels supported by the AP.

Advantageous Effects

This disclosure proposes a signaling technique used in the EHT standard or a new standard that has improved the EHT standard. Based on an example of the present disclosure, information related to radio resources (i.e., band/channel bandwidth, etc.) supported by the AP/STA may be accurately signaled.

In an example according to the present disclosure, information related to an ultra-wideband channel or a multi-band channel used in a WLAN system may be easily transmitted. Through an example of the present disclosure, only channel information added according to a new standard may be transmitted, excluding information included in a packet transmitted in the previous standard. Overhead may be reduced by transmitting only channel information added according to the new standard. According to another example of the present disclosure, all supportable channel information may be transmitted by newly defining a method for transmitting channel information according to the new standard.

DESCRIPTION OF EXEMPLARY EMBODIMENTS

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (EHT-Signal)" may mean that "EHT-Signal" is proposed as an example of "control information". Further, "control information (i.e., EHT-Signal)" may also mean that "EHT-Signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or IEEE 802.11be.

Hereinafter, technical features of a WLAN system to which the present disclosure is applicable are described in order to describe technical features of the present disclosure.

Figure 1:
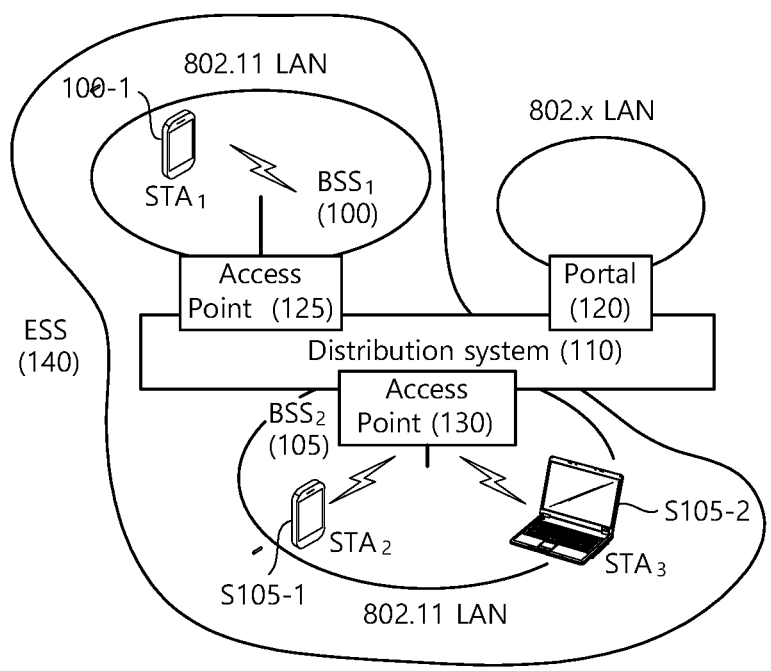
FIG. 1 is a conceptual view illustrating a structure of a wireless local area network (WLAN).
Figure 1:
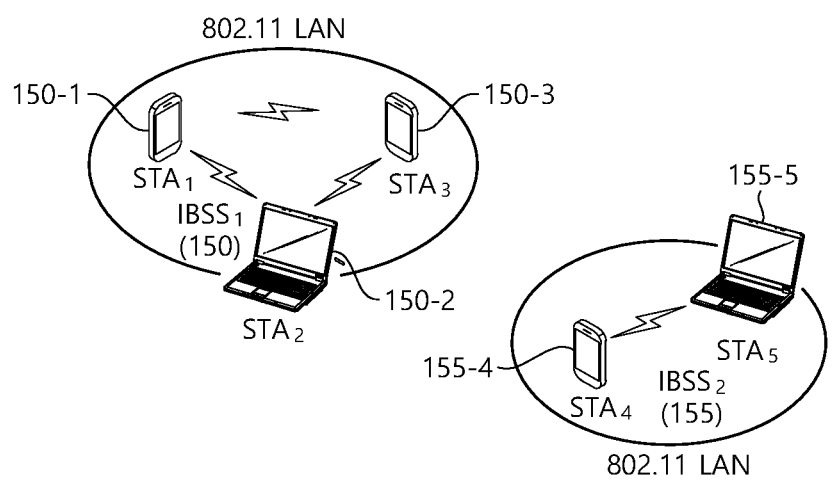

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, Aps providing a distribution service, and a distribution system (DS) 110 connecting multiple Aps.

The distribution system 110 may implement an extended service set (ESS) 140 extended by connecting the multiple BSSs 100 and 105. The ESS 140 may be used as a term indicating one network configured by connecting one or more Aps 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the Aps 125 and 130 and a network between the Aps 125 and 130 and the STAs 100-1, 105-1, and 105-2 may be implemented. However, the network is configured even between the STAs without the Aps 125 and 130 to perform communication. A network in which the communication is performed by configuring the network even between the STAs without the Aps 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the Aps and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
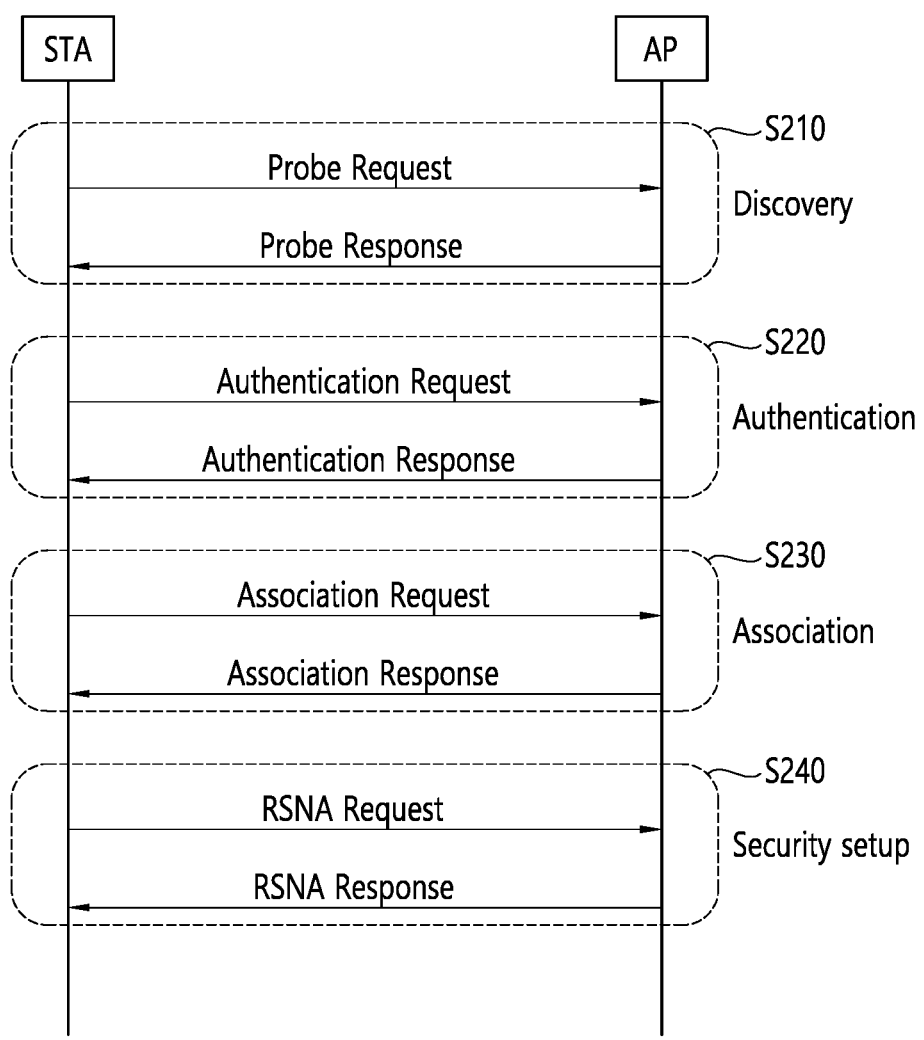
FIG. 2 is a view illustrating a general link setup process.

FIG. 2 illustrates a general link setup process.

In S210, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 2 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BS S-related information included in the received probe response frame, may move to the next channel (e.g., channel 2), and may perform scanning (e.g., transmits a probe request and receives a probe response via channel 2) by the same method.

Although not shown in FIG. 2, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S220. The authentication process may be referred to as a first authentication process to be clearly distinguished from the following security setup operation in S240. The authentication process in S220 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S230. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S240, the STA may perform a security setup process. The security setup process in S240 may include a process of setting up a private key through four-way handshaking, for example, through an extensible authentication protocol over LAN (EAPOL) frame.

Figure 3:
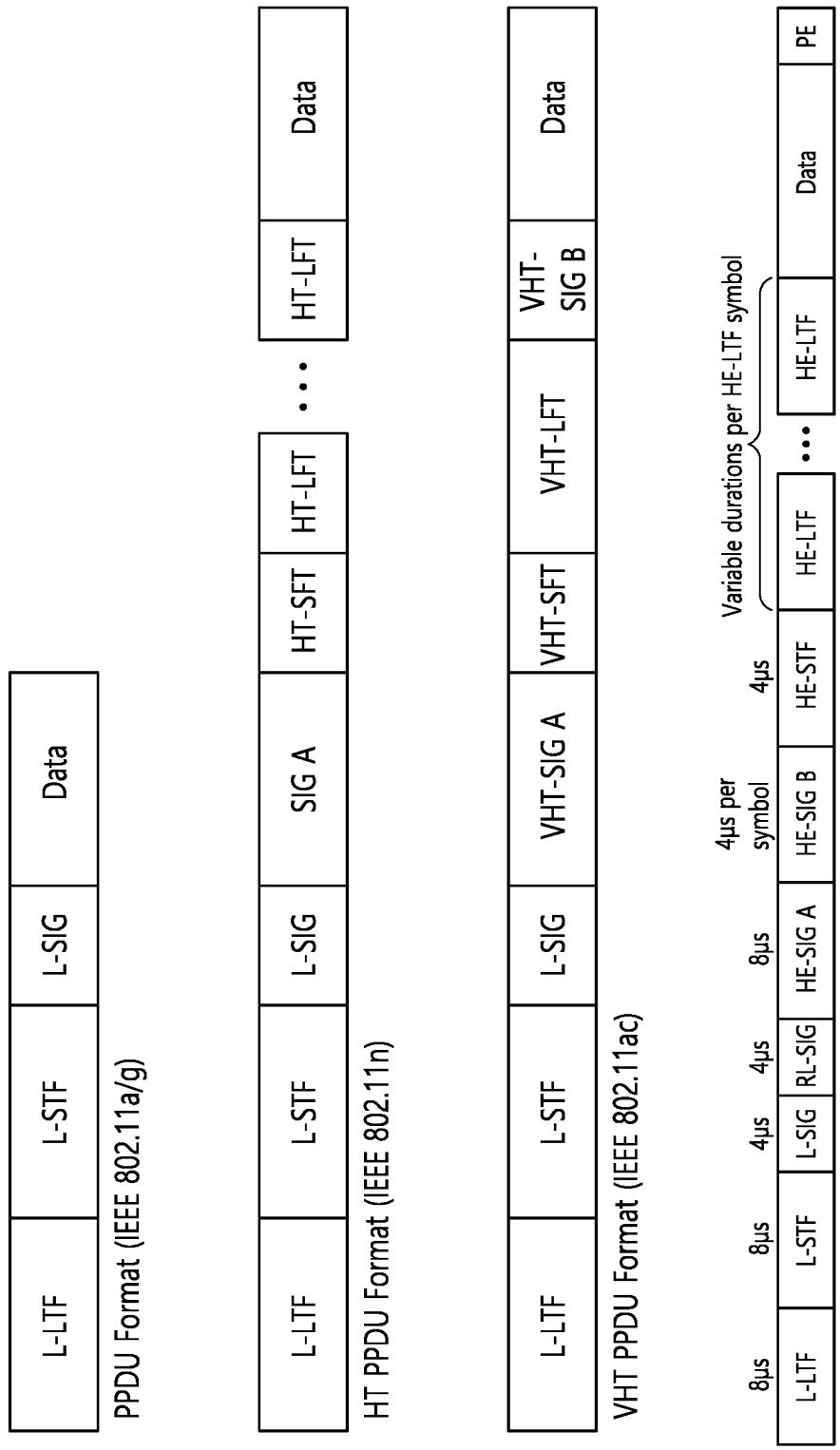
FIG. 3 is a view illustrating an example of a PPDU used in an IEEE standard.

FIG. 3 illustrates an example of a PPDU used in an IEEE standard.

As illustrated in FIG. 3, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (Mus) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
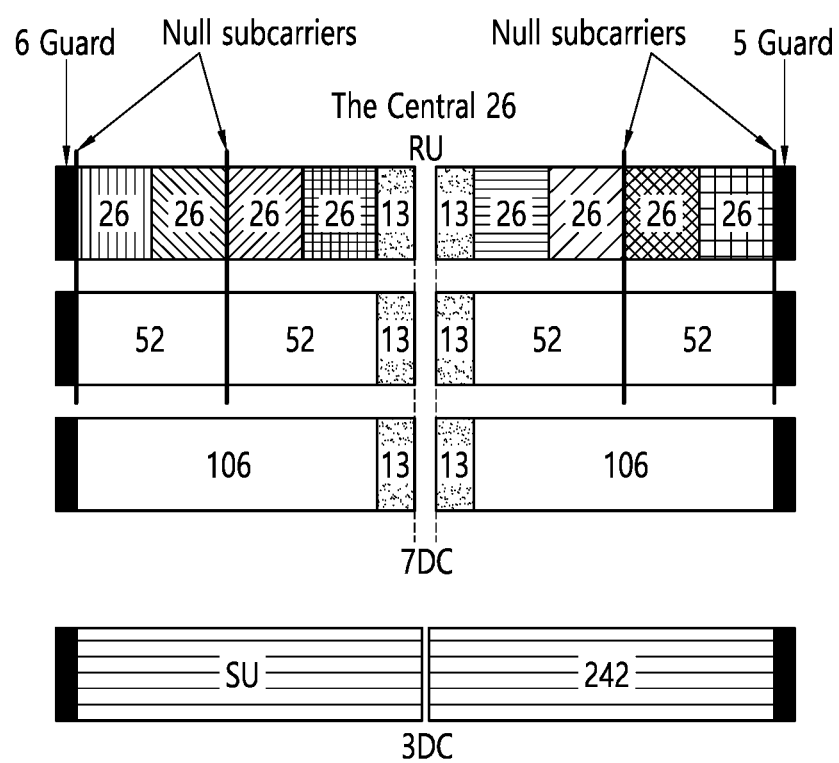
FIG. 4 is a view illustrating an arrangement of a resource unit (RU) used in a 20 MHz band.

FIG. 4 illustrates a layout of resource units (Rus) used in a band of 20 MHz.

As illustrated in FIG. 4, resource units (Rus) corresponding to different numbers of tones (i.e., subcarriers) may be used to form some fields of an HE-PPDU. For example, resources may be allocated in illustrated Rus for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the Rus in FIG. 4 may be used not only for a multiple users (Mus) but also for a single user (SU), in which case one 242-unit may be used and three DC tones may be inserted as illustrated in the lowermost part of FIG. 4.

Although FIG. 4 proposes Rus having various sizes, that is, a 26-RU, a 52-RU, a 106-RU, and a 242-RU, specific sizes of Rus may be extended or increased. Therefore, the present embodiment is not limited to the specific size of each RU (i.e., the number of corresponding tones).

Figure 5:
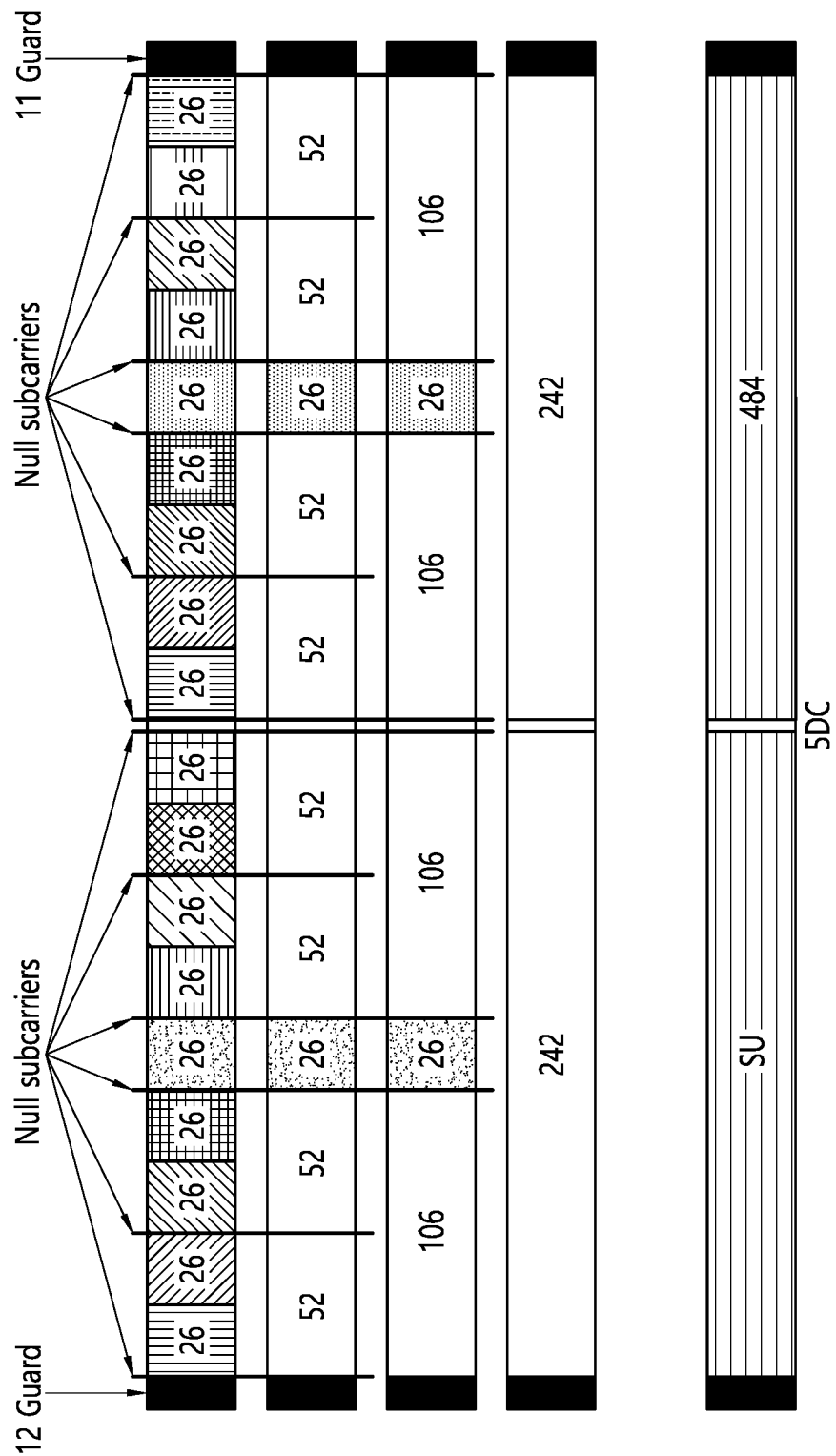
FIG. 5 is a view illustrating an arrangement of a resource unit (RU) used in a 40 MHz band.

FIG. 5 illustrates a layout of Rus used in a band of 40 MHz.

Similarly to FIG. 4 in which Rus having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 5, when the layout of the Rus is used for a single user, a 484-RU may be used. The specific number of Rus may be changed similarly to FIG. 4.

Figure 6:
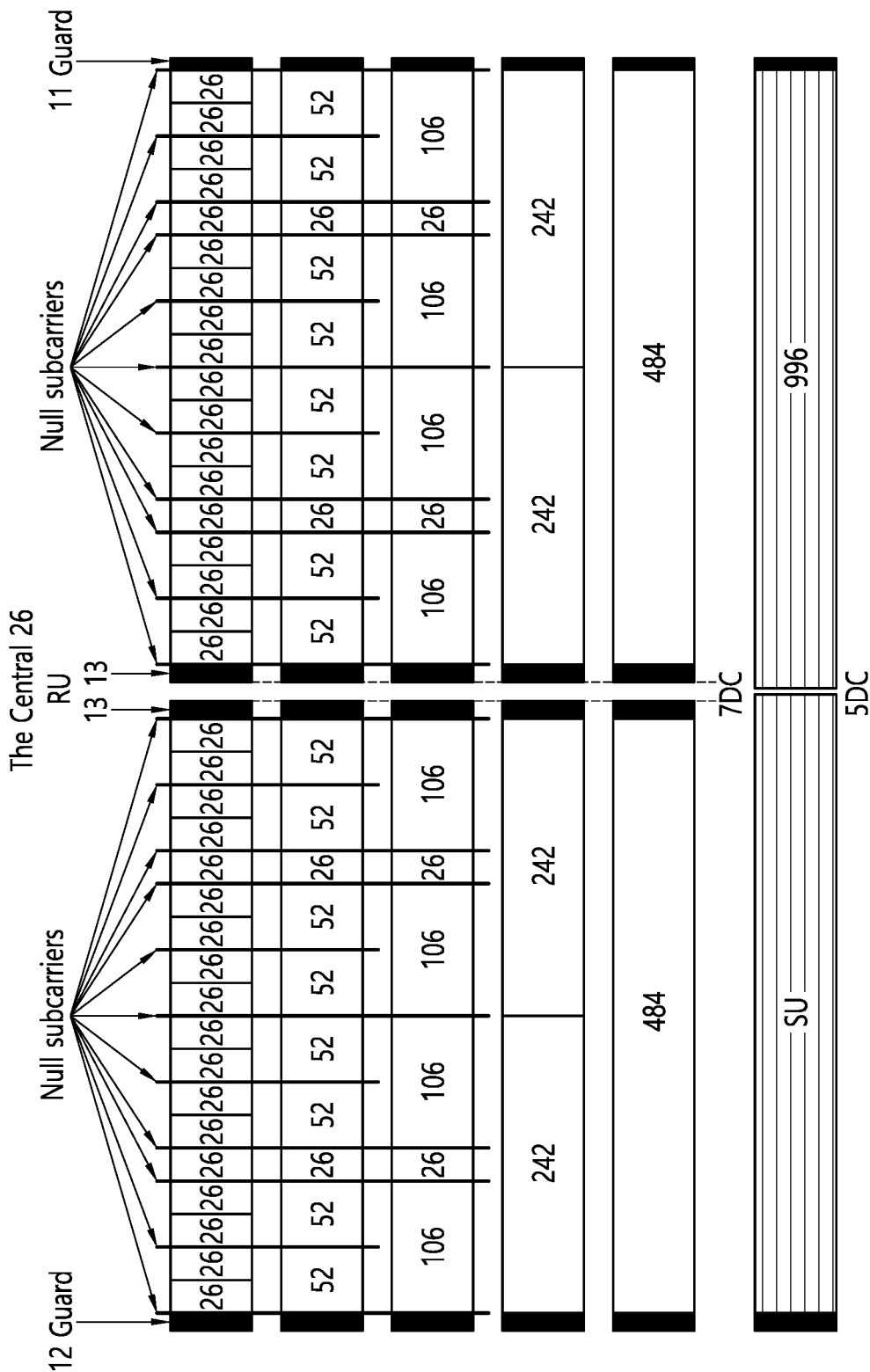
FIG. 6 is a view illustrating an arrangement of a resource unit (RU) used in an 80 MHz band.

FIG. 6 illustrates a layout of Rus used in a band of 80 MHz.

Similarly to FIG. 4 and FIG. 5 in which Rus having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 6, when the layout of the Rus is used for a single user, a 996-RU may be used, in which case five DC tones may be inserted.

The specific number of Rus may be changed similarly to FIG. 4 and FIG. 5.

Figure 7:
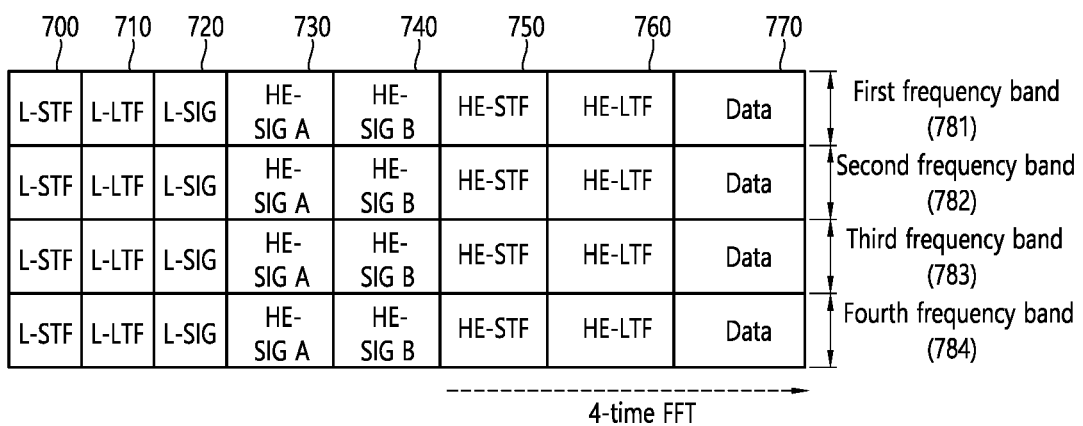
FIG. 7 is a view illustrating another example of an HE-PPDU.

FIG. 7 illustrates another example of an HE PPDU.

Technical characteristics of the HE PPDU illustrated in FIG. 7 may also be applied to an EHT PPDU to be newly proposed. For example, technical characteristics applied to an HE-SIG may also be applied to an EHT-SIG, and technical characteristics of an HE-STF/LTF may also be applied to an EHT-SFT/LTF.

An L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information related to a data rate and a data length. Further, the L-SIG 720 may be repeatedly transmitted. That is, a format in which the L-SIG 720 is repeated (which may be referred to, for example, as an R-LSIG) may be configured.

An HE-SIG-A 730 may include control information common to a receiving STA.

Specifically, the HE-SIG-A 730 may include information related to 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to an HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information related to a CRC field of the HE-SIG-A, and the like. A specific field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (Mus) as described above. Basically, an HE-SIG-A 750 or an HE-SIG-B 760 may include resource allocation information (or virtual resource allocation information) for at least one receiving STA.

An HE-STF 750 may be used for improving automatic gain control estimation in a multiple input multiple output (MIMO) environment or an OFDMA environment.

An HE-LTF 760 may be used for estimating a channel in the MIMO environment or the OFDMA environment.

The size of fast Fourier transform (FFT)/inverse fast Fourier transform (IFFT) applied to the HE-STF 750 and a field after the HE-STF 750 may be different from the size of FFT/IFFT applied to a field before the HE-STF 750. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field related to a legacy system, and the second field may include a field related to an HE system. In this case, the fast Fourier transform (FFT) size and the inverse fast Fourier transform (IFFT) size may be defined as a size which is N (N is a natural number, for example, N=1, 2, or 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values, such as 0.4 μs, 0.8 μs, 1.6 μs, 2.4 μs, and 3.2 μs.

For convenience of description, FIG. 7 shows that a frequency band used for the first field and a frequency band used for the second field accurately correspond to each other, but both frequency bands may not completely correspond to each other in actual. For example, a primary band of the first field (L-STF, L-LTF, L-SIG, HE-SIG-A, and HE-SIG-B) corresponding to the first frequency band may be the same as a primary band of the second frequency band (HE-STF, HE-LTF, and Data), but boundaries of the respective frequency bands may not correspond to each other. As illustrated in FIG. 4 to FIG. 6, since a plurality of null subcarriers, DC tones, guard tones, and the like are inserted when arranging Rus, it may be difficult to accurately adjust the boundaries.

A user, that is, a receiving STA, may receive the HE-SIG-A 730 and may be instructed to receive a downlink PPDU based on the HE-SIG-A 730. In this case, the STA may perform decoding based on the FFT size changed from the HE-STF 750 and the field after the HE-STF 750. On the contrary, when the STA may not be instructed to receive a downlink PPDU based on the HE-SIG-A 730, the STA may stop decoding and may configure a network allocation vector (NAV). A cyclic prefix (CP) of the HE-STF 750 may have a larger size than a CP of another field, and the STA may decode a downlink PPDU by changing the FFT size in a period of the CP.

Hereinafter, in an embodiment, data (or a frame) transmitted from an AP to an STA may be referred to as downlink data (or a downlink frame), and data (a frame) transmitted from an STA to an AP may be referred to as uplink data (an uplink frame). Further, transmission from an AP to an STA may be referred to as downlink transmission, and transmission from an STA to an AP may be referred to as uplink transmission.

Figure 8:
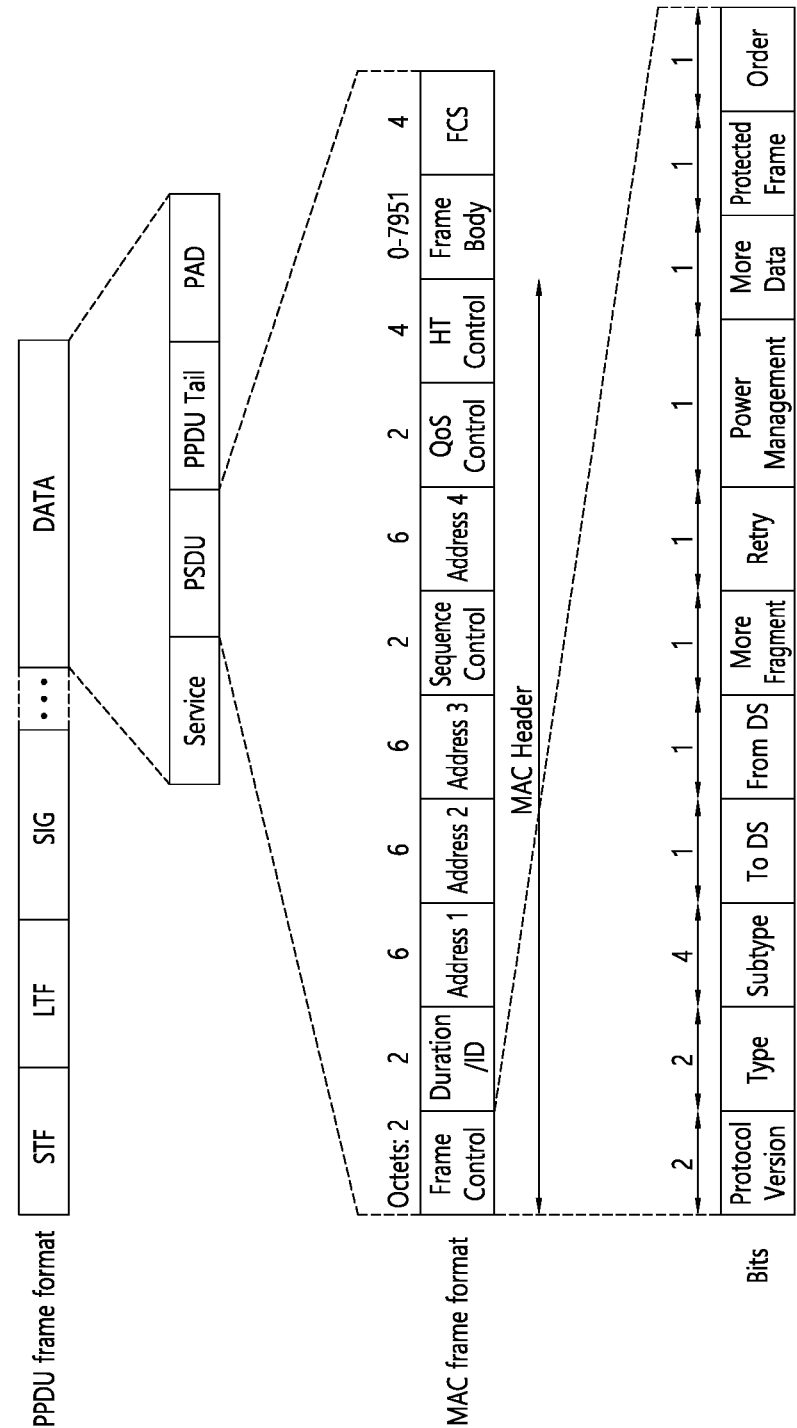
FIG. 8 is a view illustrating an example of a frame structure used in an IEEE 802.11 system.

FIG. 8 illustrates an example of a frame structure used in an IEEE 802.11 system. An STF, an LTF, and a SIG field illustrated in FIG. 8 may be the same as or equivalent to the (HT/VHT/EHT)-STF, the LTF, and the SIG field illustrated in FIG. 3 or FIG. 7. Further, a data field illustrated in FIG. 8 may be the same as or equivalent to a data field illustrated in FIG. 3 or FIG. 7.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a subtype, whether it is transmitted during a contention free period (CFP), QoS capability of a transmitting STA, or the like. In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (us). However, if the duration/ID field indicates a fixed TXOP duration value (e.g., 32768), B15=1 and B0 to B14=0. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

In the present disclosure, a band or a frequency band may refer to a frequency region in which a plurality of channels are used/supported/defined. For example, the frequency band may include a 2.4 GHz, 5 GHz, 6 GHz, or 60 GHz band. In the frequency band, a plurality of channels such as 20 MHz, 40 MHz, 80 MHz, or 160 MHz may be used/supported/defined. Channel numbers may be assigned to the plurality of channels. In the present disclosure, channel characteristics (e.g., center frequency and/or bandwidth) according to channel numbers may be previously set.

Figure 9:
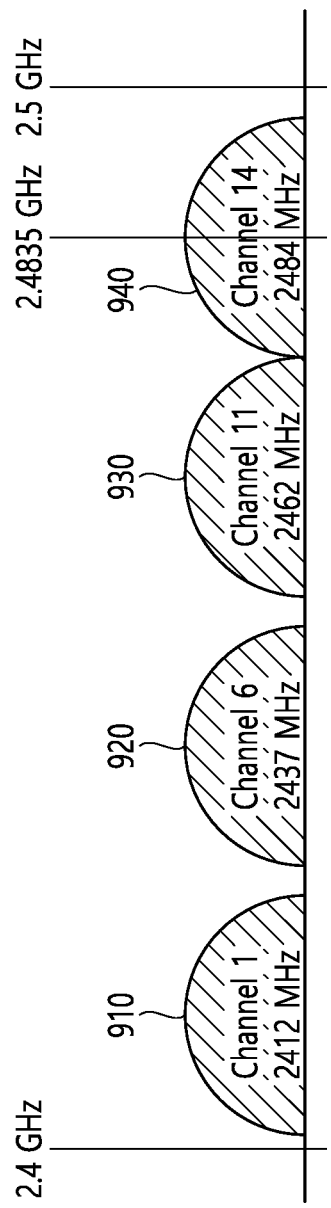
FIG. 9 illustrates a channel configuration usable in a WLAN system in a 2.4 GHz band.

FIG. 9 shows an example of channels used/supported/defined in a 2.4 GHz band.

The 2.4 GHz band may be referred to by other names such as a first band or the like. In addition, the 2.4 GHz band may refer to a frequency region in which channels with a center frequency adjacent to 2.4 GHz (e.g., channels with a center frequency located in 2.4 to 2.5 GHz) are used/supported/defined.

A wireless device may transmit and receive a signal (e.g., PPDU) through at least one channel in the 2.4 GHz band. Channels in the 2.4 GHz band and channels allowed in each country may be configured as shown in Table 1 below.

TABLE 1

| Channel | $F_0$ (MHz) | North America | Japan | Most of world |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | No | Yes | Yes |
| 14 | 2484 | No | 11b Only | No |

As shown in Table 1, 14 channels may be configured in the 2.4 GHz band. Each channel may be set to a frequency region (or bandwidth) of 20 MHz. $F_0$ may represent a center frequency. The center frequencies of the channels in the 2.4 GHz band may be configured at approximately 5 MHz intervals except for channel 14. Adjacent channels among the 14 channels may overlap each other. An allowable frequency channel or a maximum power level in the allowable frequency channel may be set to be different in each country. For example, channel 13 is not allowed in North America but is allowed in most countries.

FIG. 9 exemplarily shows four channels in the 2.4 GHz band. Each of first to fourth frequency regions 910 to 940 may include one channel. For example, a first frequency region 910 may include channel 1 of Table 1. Here, a center frequency of channel 1 may be set to 2412 MHz. A second frequency region 920 may include channel 6 of Table 1. Here, a center frequency of channel 6 may be set to 2437 MHz. A third frequency region 930 may include channel 11 of Table 1. Here, a center frequency of channel 11 may be set to 2462 MHz. A fourth frequency region 940 may include channel 14 of Table 1. Here, the center frequency of channel 14 may be set to 2484 MHz.

Table 1 and FIG. 9 exemplarily show the channel configuration in the 2.4 GHz band and specific values may be changed. For example, Table 1 and FIG. 9 show a method of configuring 14 channels between 2.4 GHz and 2.5 GHz bands, but 14 channels may be configured between 2.35 GHz and 2.45 GHz bands. In addition, the channel configuration shown in Table 1 and FIG. 9 may not be used in some countries and the channel configuration may be set to be different in each country.

Figure 10:
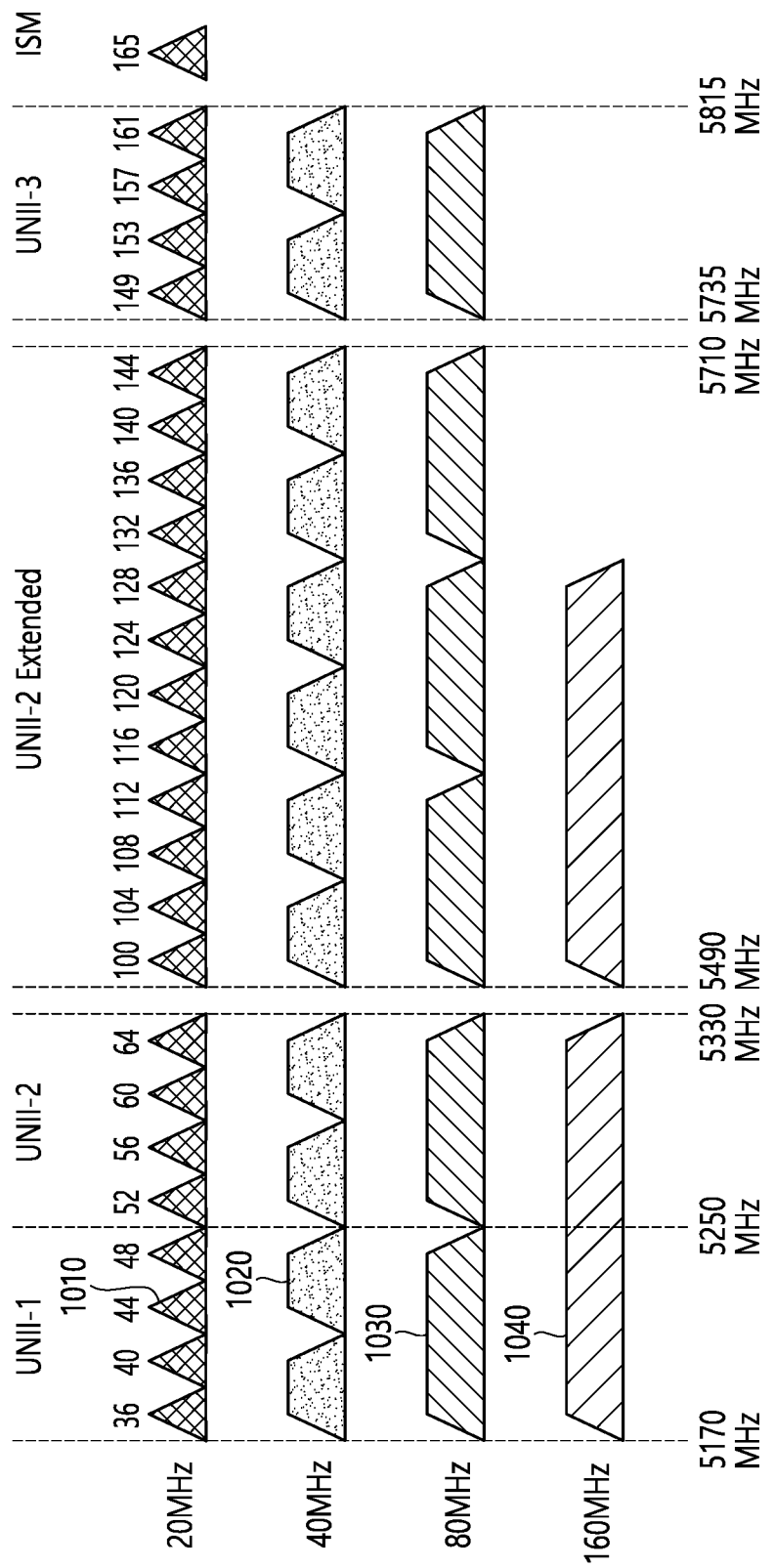
FIG. 10 illustrates a channel configuration usable in a WLAN system in a 5 GHz band.

FIG. 10 shows an example of a channel used/supported/defined IN a 5 GHz band.

A plurality of channels in the 5 GHz band include unlicensed national information infrastructure (UNII)-1, UNII-2, UNII-3, and ISM. UNII-1 may be called UNII Low. UNII-2 may include a frequency region called UNII Mid and UNII-2 Extended. UNII-3 may be called UNII-Upper.

A plurality of channels may be set in the 5 GHz band, and a bandwidth of each channel may be variously set to 20 MHz, 40 MHz, 80 MHz, or 160 MHz. For example, the 5170 MHz to 5330 MHz frequency region/range in UNII-1 and UNII-2 may be divided into eight 20 MHz channels. The 5170 MHz to 5330 MHz frequency region/range may be divided into four channels through the 40 MHz frequency region. The 5170 MHz to 5330 MHz frequency region/range may be divided into two channels through the 80 MHz frequency region. Alternatively, the 5170 MHz to 5330 MHz frequency region/range may be divided into one channel through the 160 MHz frequency region.

Distinct channel numbers may be assigned to the plurality of channels. For example, channel #44 may include a first frequency region 1010 of 20 MHz. As another example, channel #46 may include a second frequency region 1020 of 40 MHz. As another example, channel #42 may include a third frequency region 1030 of 80 MHz. As another example, channel #50 may include a fourth frequency region 1040 of 160 MHz.

FIG. 10 exemplarily shows a channel configuration in a 5 GHz band, and specific values may be changed. The 5 GHz band may be referred to by another name such as a second band. The 5 GHz band may refer to a frequency range in which channels with a center frequency of 5 GHz or higher and less than 6 GHz are used/supported/defined. Alternatively, the 5 GHz band may include a plurality of channels between 4.5 GHz and 5.5 GHz bands. In addition, the channel configuration shown in FIG. 10 may not be used in some countries and the channel configuration may be set to be different in each country. That is, the frequency regions or bandwidths according to the channel numbers may be set to be different for each country.

A plurality of channels in the 6 GHz band may be configured to be similar to the channel configuration shown in FIGS. 9 and 10. A plurality of channels in the 6 GHz band may be configured through various bandwidths. For example, a plurality of channels in the 6 GHz band may be classified through a bandwidth of 20 MHz, 40 MHz, 80 MHz, 160 MHz, 240 MHz, or 320 MHz.

Figure 11:
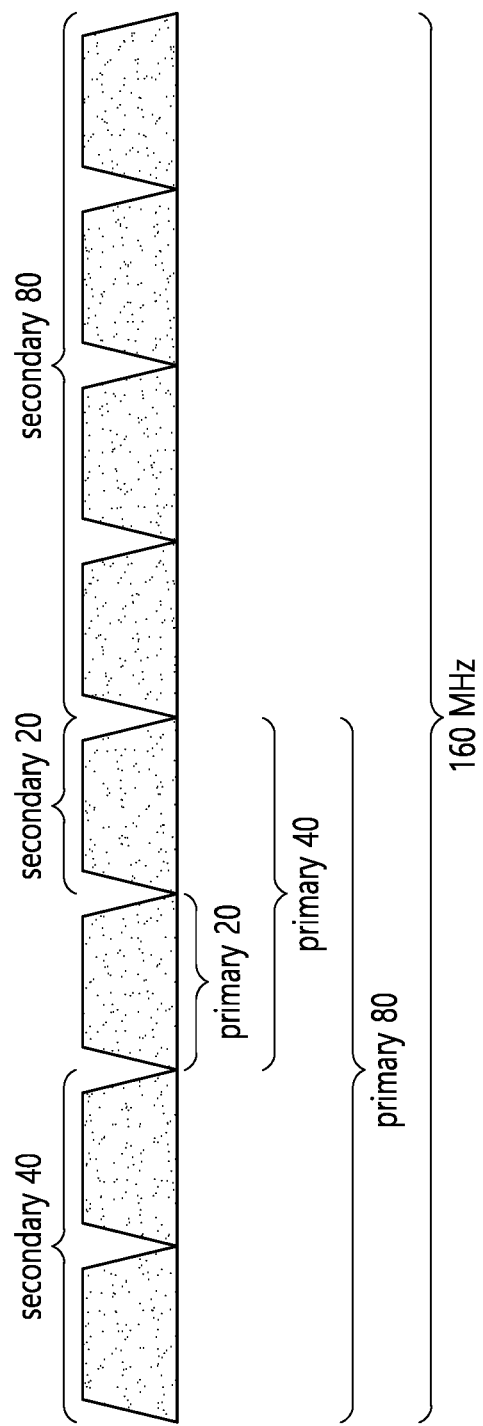
FIG. 11 illustrates channels in a 160 MHz channel.

FIG. 11 is a view illustrating a concept of a primary channel and a secondary channel.

For example, the 160 MHz channel may be divided into channels of primary 20 (MHz), secondary 20 (MHz), secondary 40 (MHz), or secondary 80 (MHz) specifically. As shown in FIG. 11, 160 MHz channels may be hierarchically configured. The channels may be used for channel bonding. For example, an STA may determine whether the primary 20 channel is in an idle state. Thereafter, the STA may determine whether the secondary 20 contiguous to primary channel 20 is idle in order to transmit a signal through a wider bandwidth. When the secondary 20 channel is idle, the STA may transmit a signal through the primary 20 channel and the secondary 20 channel. That is, the STA may transmit a signal using a 40 MHz channel. In the same manner, the STA may transmit a signal using a channel of 80 MHz or 160 MHz.

Figure 12:
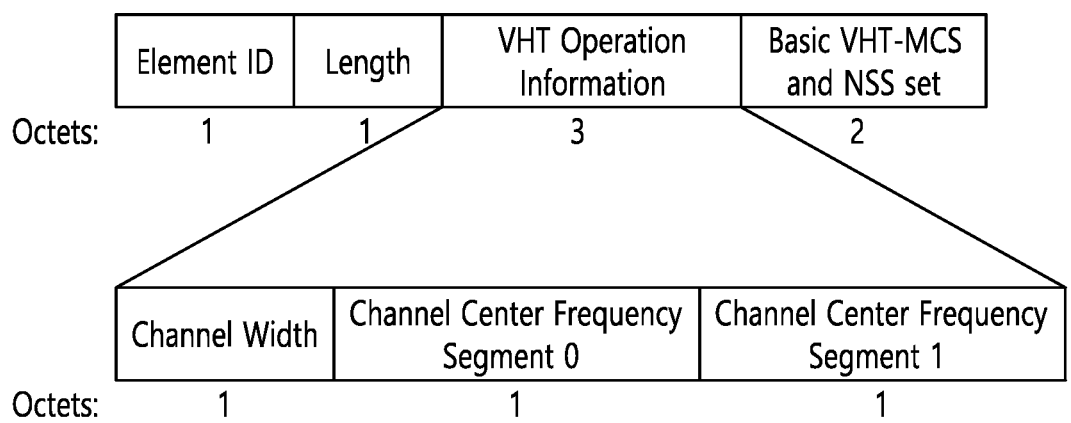
FIG. 12 illustrates a frame for providing information related to a channel.

FIG. 12 shows a frame for providing information related to a channel.

Referring to FIG. 12, a VHT operation element for transmitting information related to a channel used by an STA supporting a very high throughput (VHT) standard (i.e., a VHT STA) is illustrated. The VHT operation element may indicate channel information of a channel bandwidth of 80 MHz or 160 MHz. The VHT operation element may be transmitted from an AP to a user STA.

A non-HT STA may transmit a signal through the 20 MHz channel. An HT-STA (i.e., an STA supporting the high throughput standard) may transmit a signal through the 20 MHz or 40 MHz channel. The VHT-STA may transmit a signal through the 20 MHz, 40 MHz, 80 MHz or 160 MHz channel. In this case, the HT-STA may indicate channel information of 40 MHz through a conventional HT operation element (not shown). For example, the HT operation element may include information related to a center frequency of the primary 20 MHz channel and a center frequency of the secondary 20 MHz channel. The VHT-STA may acquire channel information of 40 MHz (e.g., the center frequency of the primary 20 MHz channel and the center frequency of the secondary 20 MHz channel) through the HT operation element and additionally acquire channel information of 80 MHz and/or 160 MHz through the VHT operation element.

Figure 13:
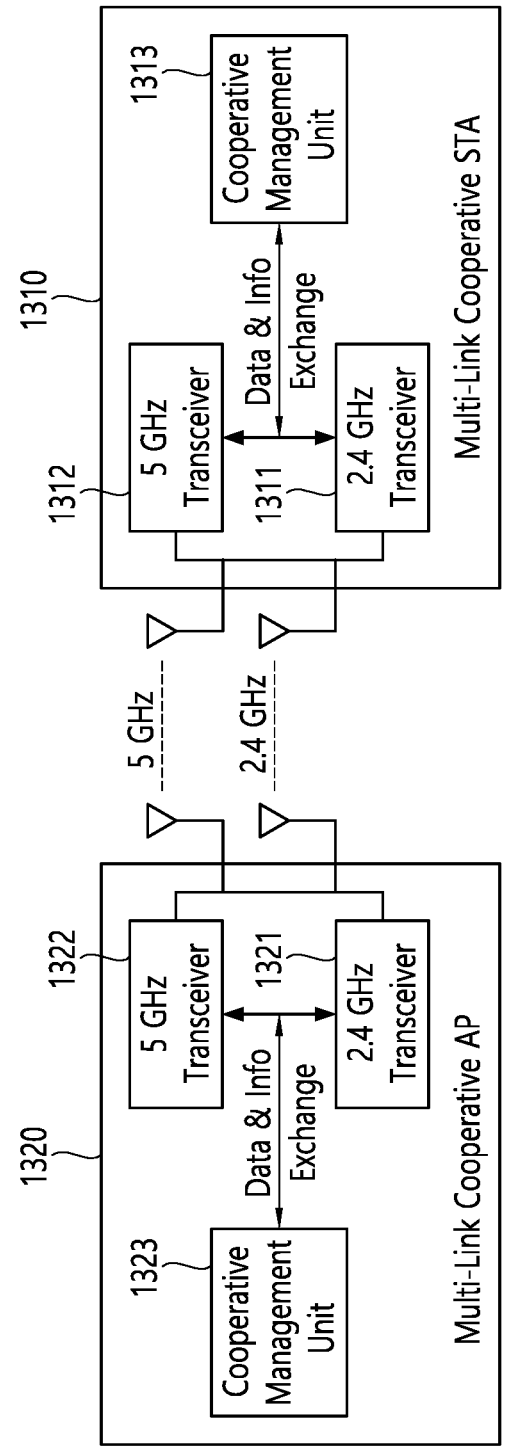
FIG. 13 illustrates a radio frequency (RF) unit for supporting a multi-band.

FIG. 13 shows an example of a transmitting/receiving device for supporting multiple links.

STA 1310 and AP 1320 may include a first transceiver supporting a first link and a second transceiver supporting a second link. In addition, the STA 1310 and the AP 1320 may include a cooperative management unit that controls the first and second transceivers. The first link may include any one channel (e.g., 20/40/80/160/240/320 MHz channel) on the first band (e.g., 2.4 GHz, 5 GHz, or 6 GHz) and the second link may include any one channel (e.g., 20/40/80/160/240/320 MHz channel) on the second band (e.g., 2.4 GHz, 5 GHz, or 6 GHz). In other words, the different links may exist on the same band or different bands.

FIG. 13 shows an example in which the first link includes the 2.4 GHz band and the second link includes the 5 GHz band. Specifically, the STA 1310 of FIG. 13 may include a 2.4 GHz transceiver 1311, a 5 GHz transceiver 1312, and a cooperative management unit 1313. That is, the 2.4 GHz transceiver 1311 is an example of the aforementioned first transceiver, and the 5 GHz transceiver 1312 is an example of the aforementioned second transceiver. Further, the AP 1320 of FIG. 13 may include a 2.4 GHz transceiver 1321, a 5 GHz transceiver 1322, and a cooperative management unit 1323.

For example, the STA 1310 and the AP 1320 may transmit and receive signals through the 2.4 GHz band and the 5 GHz band. Here, the 2.4 GHz transceiver 1311 of the STA 1310 and the 2.4 GHz transceiver 1321 of the AP 1320 may transmit and receive signals of the 2.4 GHz band. The 5 GHz Transceiver 1312 of the STA 1310 and the 5 GHz Transceiver 1322 of the AP 1320 may transmit and receive signals of the 5 GHz band.

Although not shown, the STA 1310 may include a first RF unit (or a first baseband module) and a second RF unit (or a second baseband module). For example, the STA 1310 may generate/transmit a PPDU and decode a received PPDU in the 20 MHz frequency region of the 2.4 GHz band through the first RF unit. In addition, the STA 1310 may generate/transmit a PPDU and decode a received PPDU in a maximum 160 MHz frequency region of the 5 GHz band through the second RF unit. For example, the first RF unit may be included in the 2.4 GHz transceiver 1311. For example, the second RF unit may be included in the 5 GHz transceiver 1312. According to an embodiment, the first RF unit or the second RF unit may be implemented through various methods. For example, the first RF unit or the second RF unit may be configured independently of the 2.4 GHz transceiver 1311 or the 5 GHz transceiver 1312.

For example, if a signal of the 2.4 GHz band is transmitted using an RF unit for a 5 GHz and/or 6 GHz band, performance of the corresponding RF unit may be degraded. Thus, the STA/APs 1310 and 1320 may additionally include an RF unit for the 2.4 GHz band, which is distinguished from the RF unit for the 5 GHz and/or 6 GHz band. Accordingly, the STA/AP 1310 and 1320 may include a plurality of RF units. For example, the STA 1310 may include one RF unit for the 2.4 GHz band and three RF units for the 5 GHz and/or 6 GHz band. The STA 1310 may transmit and receive signals of the 2.4 GHz band through one RF unit for the 2.4 GHz band. The STA 1310 may transmit and receive signals of the 5 GHz and/or 6 GHz band through the three RF units for the 5 GHz and/or 6 GHz band. For example, the STA 1310 may process a broadband PPDU for a specific band through the plurality of RF units. In this disclosure, "RF unit" may be simply referred to as "RF".

The STA (AP, non-AP) described below may perform multi-link communication based on the structure of FIG. 13. For example, the STA may aggregate a first link (e.g., an idle channel existing in the 2.4 GHz band) and a second link (e.g., an idle channel existing in the 5G band) and transmit the PPDU through the aggregated link (i.e., the first and second links) at the same time. More specifically, the STA may determine the idle channel in the first link, determine the idle channel in the second link, and aggregate the idle channels. The embodiments of FIGS. 14 to 17 described below relate to a technique for signaling information related to a plurality of bands/channels supported by the EHT standard. The STA may determine whether the corresponding bands/channels are idle for a specific period of time based on a band/channel signaled according to the example of FIGS. 14 to 17, and when it is determined that the bands/channels signaled according to the example of FIGS. 14 to 17 is idle for the specific period of time, the STA may aggregate the corresponding bands/channels. The PPDU may be transmitted simultaneously for the aggregated bands/channels, that is, the aggregated link.

Hereinafter, the present disclosure proposes an example for an AP to inform a neighboring STA of an ultra-wideband channel or multi-band channel of 160 MHz or higher currently being used. Specifically, the present disclosure proposes an EHT operation element transmitted through a beacon frame, a probe response frame, or an association response frame. The EHT operation element proposed in this disclosure may have a format in accordance with the IEEE 802.11be standard. The EHT operation element may support technical features described below.

The following example relates to an example for indicating an ultra-wideband channel or a multi-band channel of 160 MHz or higher currently in use, and thus, the following technical features are not limited to the term EHT. That is, the term EHT may be changed/omitted and the EHT operation element may be referred to as various terms such as a new type operation element or a first type operation element. For example, the following technical features may be applied to the EHT standard or to a new WLAN standard that enhances IEEE 802.11be.

For convenience of description, related technical features will be described based on the EHT operation element.

The AP (or transmitting STA) may define information related to an operating channel in a specific element. That is, the element may include information related to a channel in which the AP operates. The element may be included in a beacon frame periodically transmitted from the AP and transmitted to the STA. The STA may receive the beacon frame and identify information related to the operating channel of the AP. In addition, when the element is included in a probe response frame or an association response frame and the STA requests information related to a channel or connection from the AP, the element may be transmitted to the STA in response to the request.

As illustrated in FIG. 12, in the IEEE 802.11n standard, 40 MHz channel information may be defined through the HT operation element. Further, in the IEEE 802.11ac standard, information related to the 80 MHz or 160 MHz channel may be defined through the VHT operation element. Since the IEEE 802.11ax standard does not explicitly define broadband channel transmission, the HE operation element may not include information related to the existing band channel. However, since the IEEE 802.11ax standard supports a 6 GHz band operation, the HE operation element may include information related to a channel in the 6 GHz band instead of information related to the existing band channel. An STA (e.g., EHT-STA) supporting a subsequent standard (e.g., IEEE 802.11be) after IEEE 802.11ax may support an ultra-wideband channel of 160 MHz or higher. In addition, the EHT-STA may transmit signals through channels in a plurality of bands (e.g., 2.4 GHz or 5 GHz) or transmit signals through a plurality of links. For example, one BSS may use a maximum 200 MHz channel by using a 40 MHz channel in the 2.4 GHz band and a 160 MHz channel in the 5 GHz band.

The AP and/or STA according to the present disclosure include four RF units and may operate in three bands of 2.4 GHz, 5 GHz, or 6 GHz. The number of RF units or the number of supported bands may be changed. According to an embodiment, the AP and/or STA may include four or more RF units. The AP and/or STA of the present disclosure may operate in at least one of 2.4 GHz, 5 GHz, 6 GHz, 60 GHz, or 900 MHz and may operate in other bands.

This disclosure relates to a situation in which several channels are supported in one BSS. In this case, the STA may transmit/receive signals through one or a plurality of channels. That is, within the BSS, the AP and/or STA may support a plurality of channels. The STA may transmit a signal through at least one of a plurality of channels supported by the AP. At least one of the plurality of channels may be referred to as various expressions such as a link, a session, or a connection.

The EHT operation element may include operating channel information of the AP. The EHT operation element may include information related to at least one channel in the first band in which the EHT standard is supported. The VHT operation element may include information related to at least one channel in the second band in which the VHT standard is supported. The HT operation element may include an HT operation element including information related to at least one channel in a third band in which the HT standard is supported. According to an embodiment, the first band may include the 6 GHz band described above. The second band may include the 5 GHz band described above. The third band may include the 2.4 GHz band described above.

According to an embodiment, when the BSS operates in the 5 GHz and 6 GHz bands, the HT operation element may include channel information of 40 MHz in 5 GHz (e.g., information related to the primary 20 channel and the secondary 20 channel). The VHT operation element may include channel information of 80 MHz or 160 MHz in 5 GHz. The EHT operation element may include channel information in the 6 GHz band. For example, if the AP (or transmitting STA) uses channel #42 (80 MHz) and channel #155 (80 MHz) in the 5 GHz band and channel #7 (80 MHz) in the 6 GHz band, channel #7 information in the 6 GHz band may be included in the EHT operation element. Since the VHT-STA and HE-STA may operate in a channel of the 5 GHz band of the corresponding BSS, the VHT operation element may include channel information in the 5 GHz band in which the VHT-STA and HE-STA will operate. Accordingly, information related to two channels (channel #42 and channel #155) in the 5 GHz band may be included in the VHT operation element. Since the HT-STA may operate in the 40 MHz channel of the 5 GHz band of the corresponding BSS, the HT operation element may include information related to a band in which the HT-STA may operate. The HT operation element may include information related to the primary 20 MHz channel and the primary 40 MHz channel of the 5 GHz band in which the HT-STA will operate.

In order to ensure backward compatibility with the legacy STA, the EHT-STA may transmit the HT operation element and the VHT operation element together with the EHT operation element. Accordingly, the EHT-STA may include only information not included in the HT operation element and the VHT operation element in the EHT operation element and transmit the same to another STA. The EHT-STA may transmit information that does not overlap with the HT operation element and the VHT operation element in the EHT operation element. Accordingly, overhead may be reduced.

Figure 14:
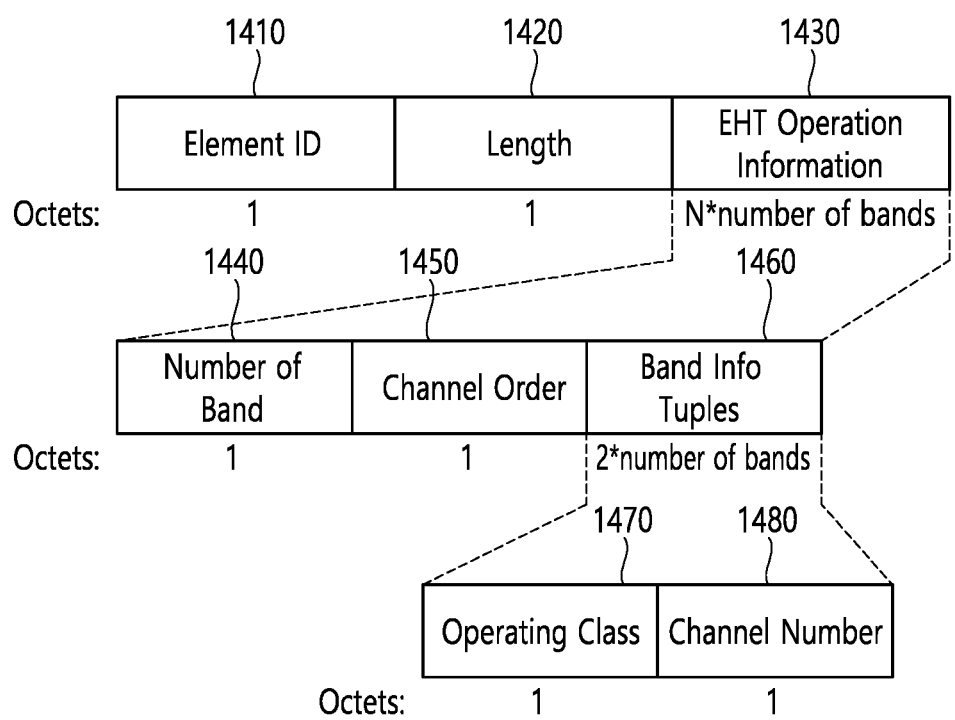
FIG. 14 illustrates a first format of an extreme high throughput (EHT) operation element.
Figure 15:
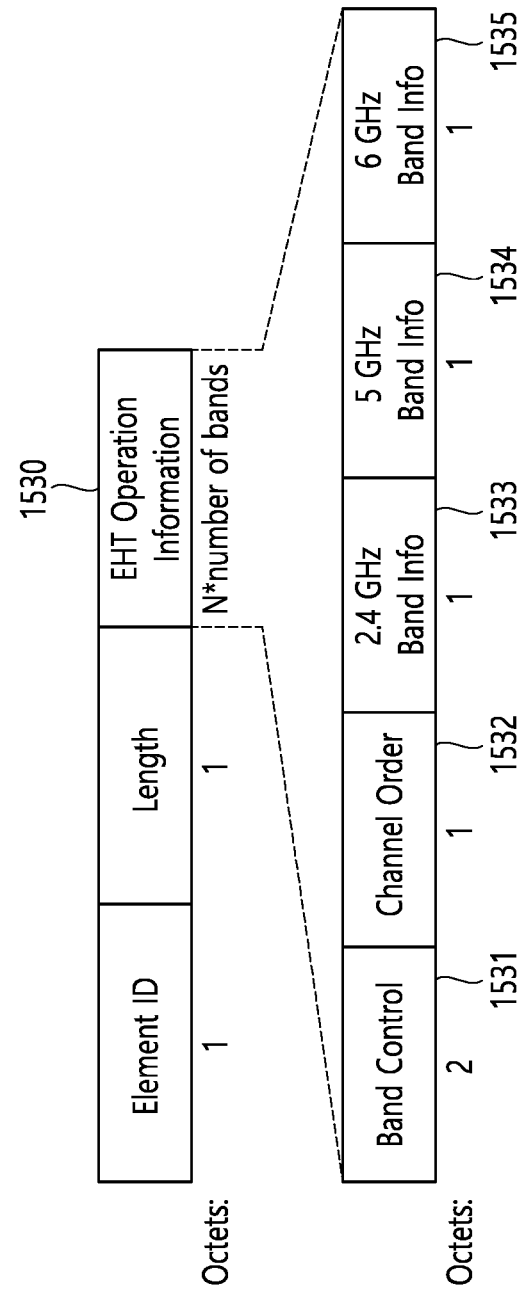
FIG. 15 illustrates a second format of the EHT operation element.

FIG. 14 may illustrate a first format of the EHT operation element, and FIG. 15 may illustrate a second format of the EHT operation element. FIG. 14 may be a format for defining information related to a band or RF not included in an operation element (e.g., VHT operation element or HT operation element) according to a conventional standard by band or RF. FIG. 15 may be a format for defining information related to all bands or RFs not included in the operation element according to the conventional standard.

FIG. 14 illustrates a first format of the EHT operation element.

Specifically, the EHT operation element may include an Element ID field 1410, a Length field 1420, or an EHT Operation Information field 1430. The Element ID field 1410 may include information related to an Element ID. The Length field 1420 may include information related to the number of octets after the Length field 1420.

The EHT Operation Information field 1430 may include a Number of Band field 1440, a Channel Order field 1450, and/or a Band Info Tuples field 1460.

The Number of Band field 1440 may include information related to the number of bands or RFs not included in the VHT operation element among a total number of bands or RFs of the BSS. For example, the AP may use channel #42 (80 MHz) and channel #155 (80 MHz) in the 5 GHz band and channel #7 (80 MHz) in the 6 GHz band. The VHT operation element may include information related to channel #42 and channel #155 in the 5 GHz band. Accordingly, the EHT operation element may include only information related to one channel 7 in the 6 GHz band. The Number of Band field 1440 in the EHT Operation Information field 1430 may have a first value (e.g., {1}).

The Channel Order field 1450 may include information related to a position of a primary channel. The Channel Order field 1450 may indicate information related to the position of the primary channel through various methods. For example, the Channel Order field 1450 may indicate a primary 20 MHz channel in 160 MHz through a bitmap.

The Band Info Tuples field 1460 may include information related to each band or RF. Specifically, the Band Info Tuples field 1460 may be repeatedly configured to indicate information related to a band or RF, excluding channel information included in the VHT operation element. For example, the AP may transmit information related to two RFs through the EHT operation element, excluding channel information included in the VHT operation element. Therefore, the Band Info Tuples field 1460 may be configured repeatedly twice.

The Band Info Tuples field 1460 may include an Operating Class subfield 1470 or a Channel Number subfield 1480.

The Operating Class subfield 1470 may include information related to an Operating Class of each band or RF. An index indicating one of the sets of rules applied to a wireless device may be defined to correspond to one Operating Class. For example, one set of rules may include a channel starting frequency, a channel spacing, a channel set, and a behavior limit set. The Operating Class may be set to be different for each country. For example, the AP may use channel #42 (80 MHz) and channel #155 (80 MHz) in the 5 GHz band and channel #7 (80 MHz) in the 6 GHz band. The VHT operation element may include information of Operating Class indicating channel #42 and channel #155 in the 5 GHz band. Therefore, the Operating Class subfield 1470 in the Band Info Tuples field 1460 may have a value (e.g., {133}) for indicating the 80 MHz channel in the 6 GHz band.

The channel number subfield 1480 may include information related to a channel number of each band or RF. For example, the AP may use channel #42 (80 MHz) and channel #155 (80 MHz) in the 5 GHz band and channel #7 (80 MHz) in the 6 GHz band. The VHT operation element may include information related to channel #42 and channel #155 in the 5 GHz band. Accordingly, the Channel Number subfield 1480 in the Band Info Tuples field 1460 may have a value (e.g., {7}) for indicating channel #7.

FIG. 15 illustrates a second format of the EHT operation element.

The EHT operation element may include operating channel information of the AP. Unlike the first format illustrated in FIG. 14, the second format may be a format for defining information related to all bands or RFs not included in the VHT operation element.

EHT Operation Information field 1530 may include a Band Control field 1531, Channel Order field 1532, 2.4 GHz Band Info field 1533, 5 GHz Band Info field 1534, or 6 GHz Band Info field 1535.

The Band Control field 1531 may include information related to a band or RF of the current BSS, excluding channel information included in the VHT operation element. The Band Control field 1531 may include information related to a combination of a band or RF in the 2.4 GHz, 5 GHz and/or 6 GHz, excluding channel information included in an operation element according to a conventional standard. For example, when the BSS operates in up to 4 RFs and 3 bands, there may be about 50 combinations of bands or RFs. A value of the Band Control field 1531 may be configured as a lookup table according to the combination of the bands or RFs. For example, the value of the Band Control field 1531 may consist of 8 bits. When the value of the Band Control field 1531 is {2}, i.e., {00000010}, it may indicate that there are two RFs for the 5 GHz band and two RFs for the 6 GHz band. According to an embodiment, the AP may transmit a mapping relationship between RFs and bands to the receiving STA through the Band Control field 1531. The receiving STA may determine an optimal RF-band mapping relationship for communication with the AP based on the mapping relationship between the bands and the RFs received from the AP.

The Channel Order field 1532 may include information related to a position of the primary channel. The primary channel may refer to a specific frequency region in which a beacon (or other control frame) may be transmitted. The Channel Order field 1532 may include information related to the position of the primary channel through various methods. For example, the Channel Order field 1532 may indicate a Primary 20 MHz Channel in the 160 MHz through a bitmap.

The 2.4 GHz Band Info field 1533 may include information related to the 2.4 GHz band. Specifically, the 2.4 GHz Band Info field 1533 may include information related to a channel number and information related to a channel width in the 2.4 GHz band.

The 5 GHz Band Info field 1534 may include information related to the 5 GHz band. Specifically, the 5 GHz Band Info field 1534 may include information related to a channel number and information related to a channel width in the 5 GHz band.

The 6 GHz Band Info field 1535 may include information related to the 6 GHz band. Specifically, the 6 GHz Band Info field 1535 may include information related to a channel number and information related to a channel width in the 6 GHz band.

The information related to the channel number included in the 2.4 GHz Band Info field 1533, the 5 GHz Band Info field 1534, and the 6 GHz Band Info field 1535 may include information related to a center frequency and a channel width (or frequency region (e.g., 20 MHz)) as described above with reference to FIGS. 9 and 10. However, the information related to the channel number may be defined to be different for each country and may not include information related to the channel width. Therefore, the 2.4 GHz Band Info field 1533, the 5 GHz Band Info field 1534, and the 6 GHz Band Info field 1535 may additionally include information related to a channel width, as well as information related to a channel number.

According to an embodiment, the second format of the EHT operation element may further include information related to an operating class in order to transmit information related to a channel-related regulation (e.g., TX power).

Hereinafter, another format of the EHT operation element will be described.

Unlike FIGS. 14 to 15, the EHT operation element may include all operating channel information of the AP. For example, if the AP is using channel #42 (80 MHz) and channel #155 (80 MHz) in the 5 GHz band and channel #7 (80 MHz) in the 6 GHz band, the EHT operation element may include all information related to three 80 MHz channels (a total of 240 MHz) and two bands (5 GHz and 6 GHz).

The VHT operation element may include information related to a band in which the VHT-STA and the HE-STA may operate. Therefore, the VHT operation element may include an overlapped part of the information included in the EHT operation element.

Since the EHT operation element may be newly configured separately from the VHT operation element or the HT operation element, all combinations of bands or RFs that may operate in the EHT-STA may be supported. For example, when the AP uses three 80 MHz channels in the 5 GHz band or three bands of 2.4 GHz, 5 GHz, and 6 GHz, the AP may indicate information related to all the channels through the EHT operation element.

Figure 16:
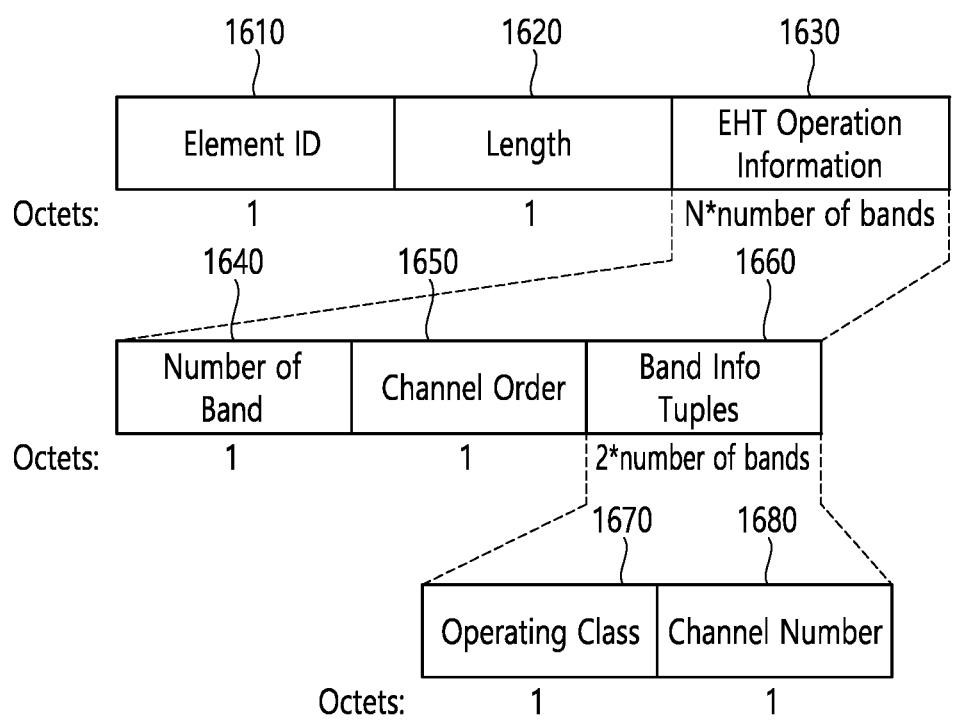
FIG. 16 illustrates a third format of the EHT operation element.
Figure 17:
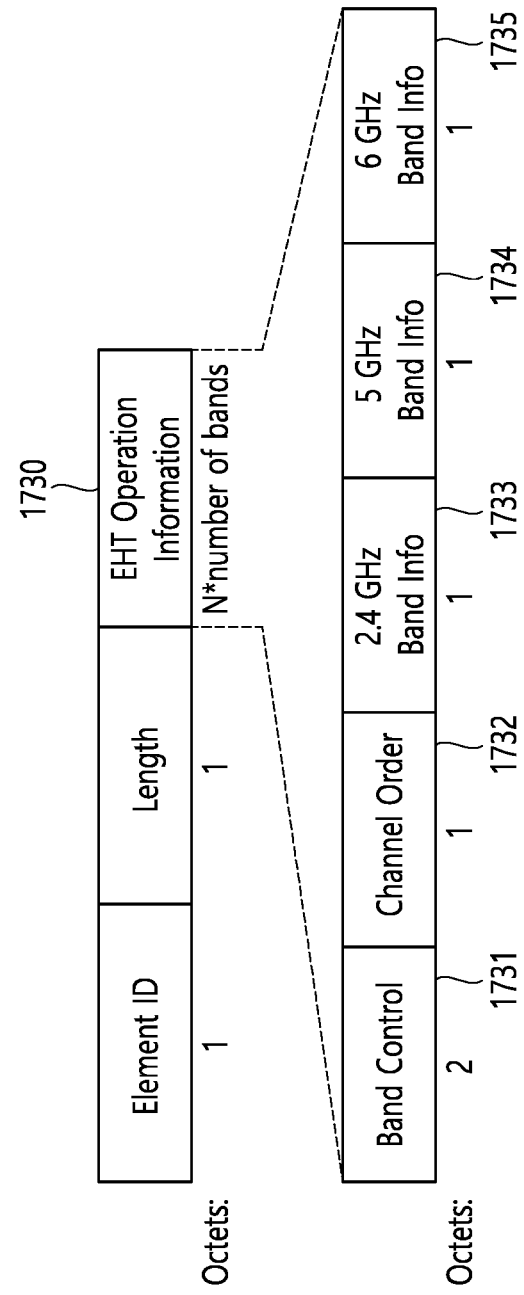
FIG. 17 illustrates a fourth format of the EHT operation element.

FIG. 16 may illustrate a third format of the EHT operation element, and FIG. 17 may illustrate a fourth format of the EHT operation element. FIG. 16 may be a format for defining information related to a band or RF by band or RF. FIG. 17 may be a format for defining information related to all bands or RFs at once.

FIG. 16 illustrates the third format of the EHT operation element.

Specifically, the EHT operation element may include an Element ID field 1610, a Length field 1620, or an EHT Operation Information field 1630. The Element ID field 1610 may include information related to an element ID. The Length field 1620 may include information related to the number of octets after the Length field 1620.

The EHT Operation Information field 1630 may include a Number of Band field 1640, a Channel Order field 1650, or a Band Info Tuples field 1660.

The Number of Band field 1640 may include information related to the number of all bands or all RFs of the BSS. For example, the AP may use channel #42 (80 MHz) and channel #155 (80 MHz) in the 5 GHz band and channel #7 (80 MHz) in the 6 GHz band. Since channel #42 and channel #155 are not contiguous in the 5 GHz band, it may be desirable for the AP to include two RFs. In addition, in order to transmit a signal of channel #7 in the 6 GHz band, the AP may include an additional RF. That is, the AP may include a total of three RFs. Accordingly, the Number of Band field 1640 in the EHT Operation Information field 1630 may have a first value (e.g., {3}).

The Channel Order field 1650 may include information related to a position of a primary channel. The Channel Order field 1650 may indicate information related to the position of the primary channel through various methods. For example, the Channel Order field 1650 may indicate a Primary 20 MHz Channel in the 160 MHz through a bitmap.

The Band Info Tuples field 1660 may include information related to the number of each of the bands or RFs. Specifically, the Band Info Tuples field 1660 may be repeatedly configured to indicate information related to the total number of bands or RFs. For example, the AP may use channel #42 (80 MHz) and channel #155 (80 MHz) in the 5 GHz band and channel #7 (80 MHz) in the 6 GHz band. The AP may require three RFs to use channel #42 and channel #155 in the 5 GHz band and channel #7 in the 6 GHz band. Therefore, the Band Info Tuples field 1660 may be configured repeatedly three times.

The Band Info Tuples field 1660 may include an Operating Class subfield 1670 or a Channel Number subfield 1680.

The operating class subfield 1670 may include information related to an operating class of each band or RF. For example, the AP may use channel #42 (80 MHz) and channel #155 (80 MHz) in the 5 GHz band and channel #7 (80 MHz) in the 6 GHz band. The AP may require three RFs to use channel #42 and channel #155 within the 5 GHz band and channel #7 in the 6 GHz band. Therefore, the Band Info Tuples field 1660 may be configured repeatedly 3 times. The Band Info Tuples field 1660 may include a first Band Info Tuples field, a second Band Info Tuples field, and a third Band Info Tuples field. Accordingly, a first Operating Class subfield in the first Band Info Tuples field including the information related to channel 42 may have a value (e.g., {128}) for indicating the 80 MHz channel in the 5 GHz band. A second Operating Class subfield in the second Band Info Tuples field including the information related to channel #155 may have a value (e.g., {128}) for indicating the 80 MHz channel in the 5 GHz band. A third Operating Class subfield in the third Band Info Tuples field including the information related to channel #7 may have a value (e.g., {133}) for indicating the 80 MHz channel in the 6 GHz band.

The Channel Number Subfield 1680 may include information related to a channel number of each band or RF. For example, the AP may use channel #42 (80 MHz) and channel #155 (80 MHz) in the 5 GHz band and channel #7 (80 MHz) in the 6 GHz band. The Band Info Tuples field 1660 may include a first Band Info Tuples field, a second Band Info Tuples field, and a third Band Info Tuples field. Accordingly, a first channel number subfield in the first Band Info Tuples field may have a value (e.g., {42}) for indicating channel #42 in the 5 GHz band. A second channel number subfield in the second Band Info Tuples field may have a value (e.g., {155}) for indicating channel #155 in the 5 GHz band. A third channel number subfield in the third Band Info Tuples field may have a value (e.g., {7}) for indicating channel #7 in the 6 GHz band.

FIG. 17 illustrates a fourth format of the EHT operation element.

The EHT operation element may include operating channel information of the AP. Unlike the third format shown in FIG. 16, the fourth format may be a format for defining information related to all bands or RFs at once.

An EHT Operation Information field 1730 may include a Band Control field 1731, Channel Order field 1732, 2.4 GHz Band Info field 1733, 5 GHz Band Info field 1734, or 6 GHz Band Info field 1735.

The Band Control field 1731 may include information related to a band or RF of the current BSS. The Band Control field 1731 may include information related to a combination of bands or RFs in 2.4 GHz, 5 GHz, or 6 GHz. For example, when the BSS operates in up to 4 RFs and 3 bands, there may be about 100 combinations of bands or RFs. A value of the Band Control field 1731 may be configured as a lookup table according to a combination of the bands or RFs. For example, a value of the Band Control field 1731 may consist of 8 bits. When the value of the Band Control field 1731 is {1}, i.e., {00000001}, it may indicate that there are two RFs for the 5 GHz band and two RFs for the 6 GHz band. As another example, when the value of the Band Control field 1731 is {5}, i.e., {00000101}, it may indicate that there are 1 RF for the 5 GHz band and 3 RFs for the 6 GHz band.

The Channel Order field 1732 may correspond to the Channel Order field 1532 of FIG. 15.

The 2.4 GHz Band Info field 1733, the 5 GHz Band Info field 1734, and the 6 GHz Band Info field 1735 may correspond to the 2.4 GHz Band Info field 1533, the 5 GHz Band Info field 1534, and the 6 GHz Band Info field 1535 of FIG. 15, respectively.

Figure 18:
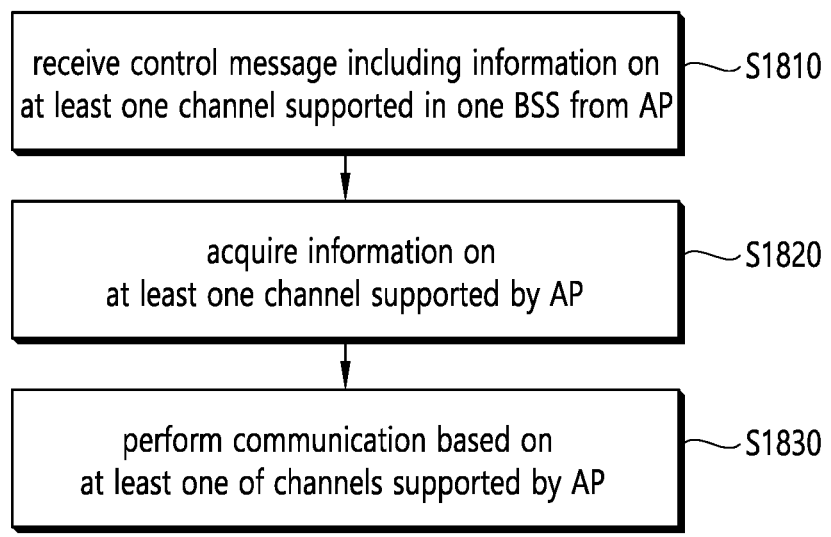
FIG. 18 is a view illustrating a reception operation to which an example of the present disclosure is applied.

FIG. 18 is a view illustrating a reception operation to which an example of the present disclosure is applied. The example of FIG. 18 may be performed in a receiving STA that receives the EHT operation element.

In step S1810, the receiving STA may receive from the AP a control message including information related to at least one channel supported in one BSS. The at least one channel supported in one BSS may be included in a plurality of bands (e.g., 2.4 GHz, 5 GHz, 6 GHz, or 60 GHz). For example, the at least one channel supported in one BSS may include channel #42 (80 MHz), channel #155 (80 MHz) and channel #7 (80 MHz) in the 5 GHz band.

The control message may include a beacon frame, a probe response frame, or an association response frame. The control message may include a message for the transmitting STA (or AP) to transmit information related to an operating channel of the transmitting STA.

The control message may include an EHT operation element including information related to at least one channel in a first band supporting the EHT standard, a VHT operation element including information related to at least one channel in a second band supporting the VHT standard, and an HT operation element including information related to at least one channel in a third band supporting the HT standard. The HT operation element may include information related to at least one channel in the third band on which the HT-STA may operate. For example, the HT operation element may include channel information of primary 20 MHz and primary 40 MHz among channels in the 2.4 GHz or 5 GHz band. The VHT operation element may include information related to at least one channel in the second band on which the VHT-STA may operate. For example, the VHT operation element may include information related to an 80 MHz or 160 MHz channel in the 5 GHz band. The EHT operation element may include information related to at least one channel in the first band on which the EHT-STA may operate. For example, the EHT operation element may include information related to a channel in the 6 GHz band.

The EHT operation element may include information for a channel number related to at least one channel in the first band and information related to a primary channel in the first band. The information for a channel number related to at least one channel in the first band may be included in the Channel Number subfield in the EHT operation element. The information related to the primary channel in the first band may be included in the Channel Order field in the EHT operation element. The Channel Order field may be configured in various manners. For example, the Channel Order field may include an 8-bit bitmap. As another example, the Channel Order field may indicate information related to a primary channel through a channel number.

The EHT operation element may include channel information that does not overlap the HT operation element or the VHT operation element. For example, the HT operation element may include information related to a 40 MHz channel in the 5 GHz band. The VHT operation element may include information related to an 80 MHz or 160 MHz channel in the 5 GHz band. Accordingly, the EHT operation element may include channel information in the 6 GHz band or information related to an ultra-wideband channel of 160 MHz or higher, which is not included in the HT operation element and the VHT operation element.

In step S1820, the receiving STA may acquire information related to at least one channel supported by the AP based on the control message. The information related to at least one channel supported by the AP may include information related to a band, a channel number, an operating class, or a primary channel.

In step S1830, the receiving STA may perform communication based on at least one of the channels supported by the AP. For example, the receiving STA may perform an association operation based on the control message and then perform communication with the AP.

Figure 19:
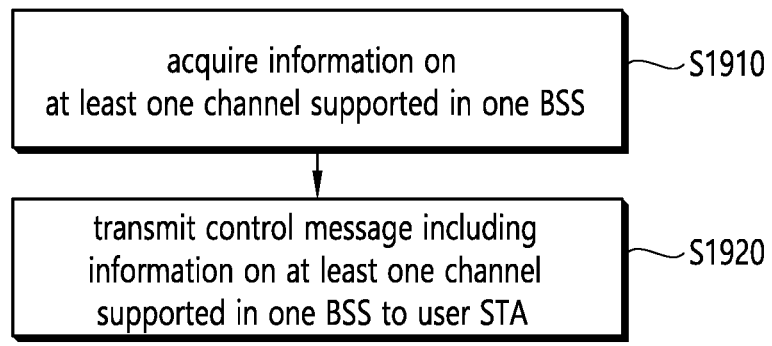
FIG. 19 is a view illustrating a transmission operation to which an example of the present disclosure is applied.

FIG. 19 is a view illustrating a transmission operation to which an example of the present disclosure is applied. The example of FIG. 19 may be performed in a transmitting STA (or AP) that transmits an EHT operation element.

In step S1910, the transmitting STA may acquire information related to at least one channel supported in one BSS. The at least one channel supported in one BSS may be included in a plurality of bands (e.g., 2.4 GHz, 5 GHz, 6 GHz, or 60 GHz). For example, the at least one channel supported in one BSS may include channel #42 (80 MHz) and channel #155 (80 MHz) in the 5 GHz and channel #7 (80 MHz) in the 6 GHz band.

In step S1920, the transmitting STA may transmit a control message including the information related to at least one channel supported in one BSS to a user STA (station).

The control message may include a beacon frame, a probe response frame, or an association response frame. The control message may include a message for the transmitting STA (or AP) to transmit information related to an operating channel of the transmitting STA.

The control message may include an EHT operation element including information related to at least one channel in a first band supporting the EHT standard, a VHT operation element including information related to at least one channel in a second band supporting the VHT standard, and an HT operation element including information related to at least one channel in a third band supporting the HT standard. The HT operation element may include information related to at least one channel in the third band on which the HT-STA may operate. For example, the HT operation element may include channel information of primary 20 MHz and primary 40 MHz among channels in the 2.4 GHz or 5 GHz band. The VHT operation element may include information related to at least one channel in the second band on which the VHT-STA may operate. For example, the VHT operation element may include information related to an 80 MHz or 160 MHz channel in the 5 GHz band. The EHT operation element may include information related to at least one channel in the first band on which the EHT-STA may operate. For example, the EHT operation element may include information related to a channel in the 6 GHz band.

The EHT operation element may include information for a channel number related to at least one channel in the first band and information related to a primary channel in the first band. The information for a channel number related to at least one channel in the first band may be included in the Channel Number subfield in the EHT operation element. The information related to the primary channel in the first band may be included in the Channel Order field in the EHT operation element. The Channel Order field may be configured in various manners. For example, the Channel Order field may include an 8-bit bitmap. As another example, the Channel Order field may indicate information related to a primary channel through a channel number.

The EHT operation element may include channel information that does not overlap the HT operation element or the VHT operation element. For example, the HT operation element may include information related to a 40 MHz channel in the 5 GHz band. The VHT operation element may include information related to an 80 MHz or 160 MHz channel in the 5 GHz band. Accordingly, the EHT operation element may include channel information in the 6 GHz band or information related to an ultra-wideband channel of 160 MHz or higher, which is not included in the HT operation element and the VHT operation element.

Figure 20:
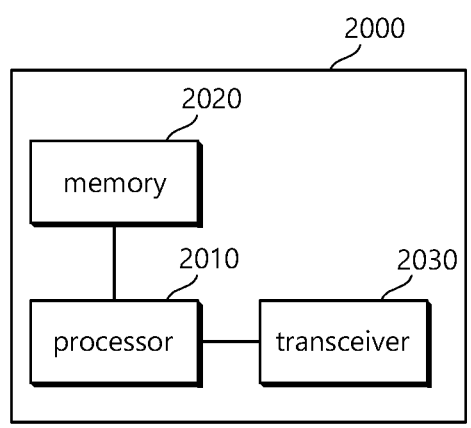
FIG. 20 illustrates a transmitting STA or a receiving STA to which an example of the present disclosure is applied.

FIG. 20 illustrates a transmitting STA or a receiving STA to which an example of the present disclosure is applied.

Referring to FIG. 20, the STA 2000 may include a processor 2010, a memory 2020, and a transceiver 2030. The features of FIG. 20 may be applied to a non-AP STA or an AP STA. The illustrated processor, memory, and transceiver may be implemented as separate chips, or at least two or more blocks/functions may be implemented through a single chip.

The illustrated transceiver 2030 performs a signal transmission/reception operation. Specifically, the transceiver 2030 may transmit and receive IEEE 802.11 packets (e.g., IEEE 802.11a/b/g/n/ac/ax/be, etc.).

The processor 2010 may implement the functions, processes, and/or methods proposed in the present disclosure. Specifically, the processor 2010 may receive a signal through the transceiver 2030, process the received signal, generate a transmission signal, and perform control for signal transmission.

The processor 2010 may include an application-specific integrated circuit (ASIC), another chipset, a logic circuit, and a data processing device. The memory 2020 may include read-only memory (ROM), random access memory (RAM), flash memory, memory card, storage medium, and/or other storage device.

The memory 2020 may store a signal (i.e., a reception signal) received through the transceiver and may store a signal (i.e., a transmission signal) to be transmitted through the transceiver. That is, the processor 2010 may acquire the received signal through the memory 2020 and store the signal to be transmitted in the memory 2020.

Figure 21:
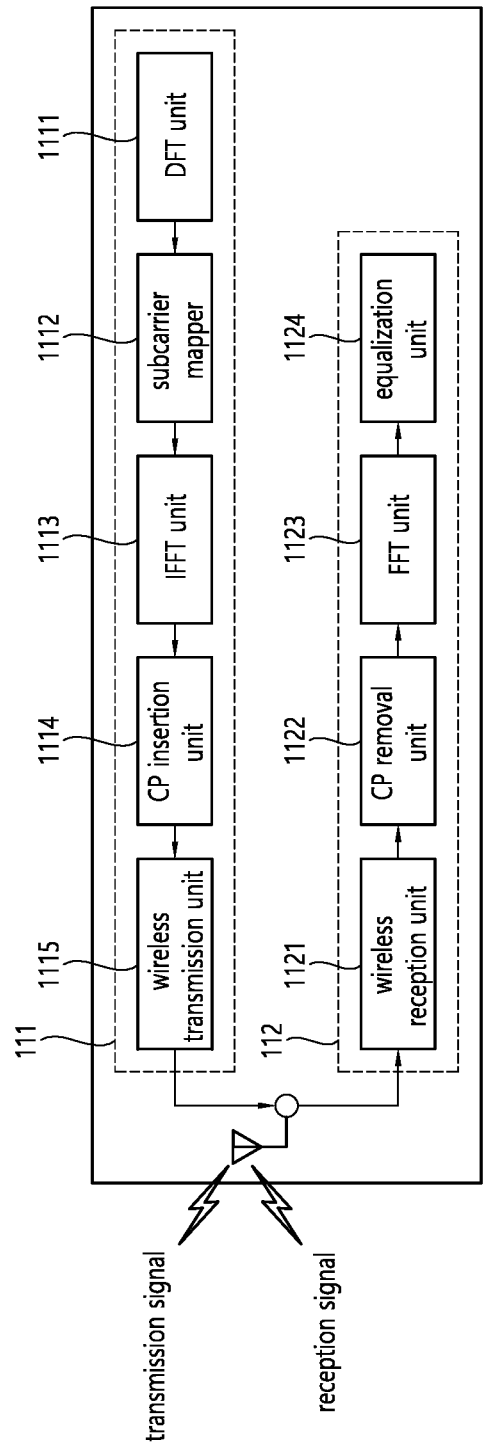
FIG. 21 illustrates another example of a detailed block diagram of a transceiver.

FIG. 21 illustrates another example of a detailed block diagram of a transceiver. Some or all blocks of FIG. 21 may be included in the processor 2010. Referring to FIG. 21, a transceiver 110 includes a transmission part 111 and a reception part 112. The transmission part 111 includes a discrete Fourier transform (DFT) unit 1111, a subcarrier mapper 1112, an inverse fast Fourier transform (IFFT) unit 1113, a CP insertion unit 1114, and a wireless transmission unit 1115. The transmission part 111 may further include a modulator. In addition, for example, the transmission part 111 may further include a scramble unit (not shown), a modulation mapper (not shown), a layer mapper (not shown), and a layer permutator (not shown), and these components may be arranged before the DTF unit 1111. That is, in order to prevent an increase in a peak-to-average power ratio (PAPR), the transmission part 111 allows information to first go through the DFT unit 1111 before mapping a signal to a subcarrier. After a signal spread by the DFT unit 1111 (or precoded in the same sense) is mapped through the subcarrier mapper 1112, the mapped signal goes through the IFFT unit 1113 so as to be generated as a signal on a time axis.

The DFT unit 1111 performs DFT on input symbols and outputs complex-valued symbols. For example, when Ntx symbols are input (here, Ntx is a natural number), a DFT size is Ntx. The DFT unit 1111 may be referred to as a transform precoder. The subcarrier mapper 1112 maps the complex-valued symbols to each subcarrier in a frequency domain. The complex symbols may be mapped to resource elements corresponding to a resource block allocated for data transmission. The subcarrier mapper 1112 may be referred to as a resource element mapper. The IFFT unit 1113 performs IFFT on an input symbol and outputs a baseband signal for data as a time domain signal. The CP insertion unit 1114 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 112 includes a wireless reception unit 1121, a CP removal unit 1122, an FFT unit 1123, an equalization unit 1124, and the like. The wireless reception unit 1121, the CP removing unit 1122, and the FFT unit 1123 of the receiving part 112 perform reverse functions of the wireless transmission unit 1115, the CP insertion unit 1114, and the IFF unit 1113 of the transmitting part 111. The receiving part 112 may further include a demodulator.

In addition to the illustrated blocks, the transceiver of FIG. 21 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, the method comprising:
   receiving, by a station (STA) from an access point (AP), a control message including information related to a basic service set (BSS),
   wherein the control message includes an extreme high throughput (EHT) operation element including information related to an EHT standard, a very high throughput (VHT) operation element including information related to a VHT standard, and a high throughput (HT) operation element including information related to an HT standard, wherein the VHT operation element includes information related to at least one first operating channel allocated for a transmission of a VHT physical protocol data unit (PPDU), the at least one first operating channel is included in at least one first band, and the at least one first band is at least one of a 2.4 GHz band, a 5 GHz band, or a 6 GHz band, wherein the EHT operation elements includes a first field, a second field being contiguous to the first field, and a third field being contiguous to the second field, wherein a value of the first field is determined as a number of bands supporting a transmission of an EHT PPDU minus the at least one first band, wherein the second field indicates a frequency position of a Primary 20 MHz channel of the BSS, wherein the third field includes an operating class sub-field and a channel number sub-field of at least one second operating channel which is not indicated by the VHT operation element, and wherein the operating class sub-field indicates channel starting frequency information, channel spacing information, and behavior limit information of the at least one second operating channel;

acquiring information related to the at least one first operating channel and the at least one second operating channel; and performing communication based on the acquired information.

2. The method of claim 1, wherein the control message is a beacon message, a probe response message, or an association response message.

3. The method of claim 1, wherein each of the first field, the second field, the operating class sub-field and the channel number sub-field has a length of one octet.

4. The method of claim 1, wherein the second field is configured as 8 bits, and each of the 8 bits is corresponding to a 20 MHz channel within a 160 MHz channel.

5. A device in a wireless local area network (WLAN) system, the device comprising:

a transceiver configured to receive a wireless signal; and a processor configured to control the transceiver, wherein the processor is configured to receive, from an access point (AP), a control message including information related to a basic service set (BSS) through the transceiver, wherein the control message includes an extreme high throughput (EHT) operation element including information related to an EHT standard, a very high throughput (VHT) operation element including information related to a VHT standard, and a high throughput (HT) operation element including information related to an HT standard, wherein the VHT operation element includes information related to at least one first operating channel allocated for a transmission of a VHT physical protocol data unit (PPDU), the at least one first operating channel is included in at least one first band, and the at least one first band is at least one of a 2.4 GHz band, a 5 GHz band, or a 6 GHz band, wherein the EHT operation elements includes a first field, a second field being contiguous to the first field, and a third field being contiguous to the second field, wherein a value of the first field is determined as a number of bands supporting a transmission of an EHT PPDU minus the at least one first band, wherein the second field indicates a frequency position of a Primary 20 MHz channel of the BSS, wherein the third field includes an operating class sub-field and a channel number sub-field of at least one second operating channel which is not indicated by the VHT operation element, and wherein the operating class sub-field indicates channel starting frequency information, channel spacing information, and behavior limit information of the at least one second operating channel;

to acquire information related to the at least one first operating channel and the at least one second operating channel, and to perform communication based on the acquired information.

6. The device of claim 5, wherein the control message is a beacon message, a probe response message, or an association response message.

7. The device of claim 5, wherein each of the first field, the second field, the operating class sub-field and the channel number sub-field has a length of one octet.

8. The device of claim 5, wherein the second field is configured as 8 bits, and each of the 8 bits is corresponding to a 20 MHz channel within a 160 MHz channel.

* * * * *